No. 736,401.

Patented August 18, 1903.

UNITED STATES PATENT OFFICE.

GEORGES JACQUEMIN, OF MALZEVILLE, FRANCE.

PREPARATION OF YEAST.

SPECIFICATION forming part of Letters Patent No. 736,401, dated August 18, 1903.

Application filed May 22, 1901. Serial No. 61,378. (No specimens.)

*To all whom it may concern:*

Be it known that I, GEORGES JACQUEMIN, chemist, a citizen of the Republic of France, and a resident of Malzeville, near Nancy, France, have invented a certain new and useful Improvement in the Preparation of Yeasts, of which the following is a specification.

This invention relates to a process of so preparing brewery-yeasts of the low-fermentation class that they will ferment only at a high temperature.

Hitherto methods of brewing beer could be divided into two principal classes, according to whether the yeast employed was called "low" (bottom) fermentation or "high" (top) fermentation. The low-fermentation yeasts, which are always employed at a temperature lower than $+10°$ centigrade, produce the mellow or soft beers of Eastern France, Alsace, Germany, &c., (technically known as "light beers,") while the high-fermentation yeasts, which are employed always at a temperature exceeding $+10°$ centigrade, give beers of the kind brewed in the north of France and elsewhere, (stronger ales.)

Low-fermentation beers have a great tendency to referment when they are sent out or kept at a temperature exceeding that of their original fermentation, and the result for the brewer or retailer is the necessity of storing these beers in cool cellars at about zero (centigrade) and sending them out in ice-wagons. It is therefore most desirable to be able to brew a beer possessing all the qualities of those obtained by low fermentation, but not necessitating the use of ice in making, preserving, or sending out the same.

My present invention consists of a process whereby I modify the conditions of existence of all yeasts of the low-fermentation class and cause them to acquire the property of fermenting at a high temperature, even exceeding $20°$ centigrade, while preserving in the beer the qualities of the kind which are most appreciated by the public. Beers thus fermented at a high temperature are free from the objection of becoming turbid or turning sour when preserved and when sent out without ice. I will now set forth the process for preparing a yeast having these properties. This process is applicable to any yeast; but it is nevertheless preferable to treat a pure yeast.

Every preparation of yeast ought to be made in a microbiological laboratory, and the explanations which I will give are easy to understand and to be put into practice by all chemists having studied microbiology. It is only when the yeasts have been thus prepared by competent persons that they will be sent to breweries where they will be employed for fermentation of beer unless the brewery is provided with a bacteriological laboratory, and in that case it is obvious that the chemist, who will have charge of this part of the brewery, will know how to apply without difficulty what I shall describe for the preparation of yeast.

When it is wished to accustom or temper any particular low-fermentation yeast to the conditions of existence at a high temperature, I commence by preparing a pure culture thereof by known methods. The pure culture of the yeast being effected in any nourishing medium used in the laboratory, (beer must or wort, for example,) I substitute little by little in successive cultures for one part of the nourishing-must an equal quantity of the same medium to which has been added an organic acid of the character hereinafter described in such a manner as to attain after a sufficient number of operations the cultivation of the yeast alone in a nourishing medium having an acidity equivalent to seven grams of tartaric acid per liter. All these cultures are made, preferably, at a temperature slightly above that at which the beer is to be fermented. The organic acids which may be employed are citric acid, lactic and tartaric acids. They have the common property of promoting the propagation of the yeast-cells, and any one or other of them can be employed for the purpose, provided they are used in such proportion that their acidity expressed in tartaric acid shall be equivalent to seven grams of tartaric acid per liter. In case of citric acid, for example, it will be necessary to use 6.54 grams per liter, which produce an acidity equivalent to seven grams tartaric acid.

To make my invention more clearly understood, I may give the following detailed examples: I commence by cultivating one hundred grams of yeast in a pasty state in ten liters of the wort of strong beer. I form this wort of an infusion of twenty-five to thirty kilos of malt in one hectoliter of water, with the addition after filtration of two hundred grams of hops per hectoliter, and I submit this to decoction for a period of an hour, then to a new filtration. The temperature at which the process of fermentation is carried on is 20° centigrade for yeast of Munich beer. When the tumultuous fermentation is ended, which is ascertained by noting that the disengagement of carbonic acid is almost completely terminated and that the yeast has accumulated at the bottom of the receiver, I decant three-fourths of the liquid and replace it by an equal quantity of wort of the original composition, but with the addition of one gram of tartaric acid per liter, and I then allow the fermentation to go on at a temperature surpassing by 1° centigrade that at which it would be desired to have the beer ferment. At the end of forty-eight hours I decant again three-fourths of the liquid and replace it by an equal quantity of wort of the original composition, but with the addition of two grams of the tartaric acid per liter. I then allow the fermentation to go on as before, and at the end of forty-eight hours I recommence the same operation, increasing the acidity by one gram of the tartaric acid per liter. These successive cultures are continued until I have reached a stage where the yeast is in a must containing seven grams of tartaric acid per liter. The yeast thus prepared possesses the property desired—that is to say, it can be employed for the fermentation of beer at a high temperature, above 20° centigrade—and the beer obtained will have the same good quality as if it had been made in a cooled cellar.

The yeast possessing the required quality can also be obtained in the following manner, which varies only slightly from the method I have described: I take one hundred grams of yeast in a pasty state and add them to ten liters of must of strong beer prepared as described above and with the addition of one gram of tartaric acid per liter. I maintain this liquid at a temperature higher by 1° centigrade than that at which the beer is to ultimately ferment, and I wait for the fermentation to terminate. This is ascertained by cessation of the disengagement of the carbonic acid. The yeast collected at the bottom of the liquid is introduced into ten liters of must of strong beer with the addition of two grams of tartaric acid per liter. I allow the fermentation to go on at a temperature surpassing by 1° centigrade that at which the beer is to be ultimately fermented. When the fermentation has ceased, I remove the yeast which has collected at the bottom and place it in ten liters of strong wort or must containing three grams of tartaric acid. On the termination of the fermentation I collect the yeast, and so proceed progressively, raising the amount of tartaric acid in successive fermentations till the wort contains seven grams of tartaric acid per liter, the operation being carried on under the conditions of temperature above described. The yeast finally obtained possesses the property of making the beer ferment at a high temperature, even surpassing 20° centigrade, while retaining the good qualities of beers obtained by fermentation at low temperature. The yeast thus prepared does not mount to the surface of the beer in fermentation, as do ordinary high or top yeasts. It remains below and falls immediately to the bottom of the receivers which contain the beer, thus producing rapid clarification.

It is to be understood that in the one or other of these methods of preparing yeast a little less or more acidity and extending even to ten grams of tartaric acid per liter might be employed without materially altering my process.

I claim as my invention—

1. A process of preparing low-fermentation yeast to give it the property of fermenting at a high temperature, which process consists in cultivating the low yeast in a nutritive medium and in substituting progressively in successive cultures, for a part of the nutritive medium, an equal quantity of a must to which has been added an organic acid of the class specified, substantially as above described.

2. A process of preparing low-fermentation yeast to give it the property of fermenting at a high temperature, which process consists in cultivating the low yeast in a nutritive must and in substituting progressively in successive cultures for a part of the nutritive must, an equal quantity of a must to which has been added an organic acid of the class specified, the treatment taking place at a temperature higher than that at which it is wished to cause the beer to ferment, substantially as described.

In testimony whereof I have signed my name to this specification in the presence of two subscribing witnesses.

GEORGES JACQUEMIN.

Witnesses:
GUSTAVE DUMONT,
EDWARD P. MACLEAN.